(12) United States Patent
Soloway

(10) Patent No.: US 6,177,925 B1
(45) Date of Patent: Jan. 23, 2001

(54) CUSTOMIZED OVERLAY TEMPLATE FOR ALARM CONTROL PANEL KEYPAD

(75) Inventor: Richard L. Soloway, New York, NY (US)

(73) Assignee: Napco Security Systems, Inc., Amityville, NY (US)

( * ) Notice: Under 35 U.S.C. 154(b), the term of this patent shall be extended for 0 days.

(21) Appl. No.: 09/196,485

(22) Filed: Nov. 19, 1998

(51) Int. Cl.$^7$ ...................................................... G09G 5/00
(52) U.S. Cl. ............................................. 345/169; 341/22
(58) Field of Search ................................. 341/20, 22, 23; 345/169, 173, 172

(56) References Cited

U.S. PATENT DOCUMENTS

| | | | | |
|---|---|---|---|---|
| 5,083,240 | * | 1/1992 | Pasco | 362/26 |
| 5,150,118 | * | 9/1992 | Finkle et al. | 341/23 |
| 5,652,850 | | 7/1997 | Hollander . | |
| 5,674,018 | * | 10/1997 | Kaufman et al. | 400/473 |
| 5,703,625 | * | 12/1997 | Snider et al. | 345/168 |
| 5,899,553 | * | 5/1999 | Howell | 362/84 |
| 5,909,211 | * | 6/1999 | Combs et al. | 345/172 |
| 5,917,906 | * | 6/1999 | Thornton | 379/433 |
| 5,940,015 | * | 8/1999 | Thornton et al. | 341/20 |

* cited by examiner

Primary Examiner—Kent Chang
(74) Attorney, Agent, or Firm—John R. Mugno

(57) ABSTRACT

An alarm control panel and keypad for programming a security system having a panel keypad face which includes a plurality of push-button activation keys is described comprising a customized overlay template which is sized to overlay the panel keypad face in a manner which maintains exposure to the push-button activation keys and displays, wherein the customized overlay template is formed by feeding a standard-sized, rectangular paper or plastic sheet through a printer which provides desired written indicia whereby the customized overlay template is separated from the paper or plastic sheet by means of pre-fabricated perforations. The customized overlay template typically could be applied to the panel face by means of an overlaying protective acrylic cover, but also may be glued directly to the face of the panel.

5 Claims, 4 Drawing Sheets

CUSTOMIZED OVERLAY TEMPLATE FOR ALARM CONTROL PANEL KEYPAD

FIELD OF THE INVENTION

This invention is generally directed to means for providing information on an alarm control panel keypad. More specifically, a keypad overlay template of the present invention provides for an inexpensive and modifiable means for providing written information on an alarm control panel keypad.

BACKGROUND OF THE INVENTION

An alarm system, which may include various sensors to protect premises against intruders, fire conditions, high carbon monoxide levels, temperature sensitivity and the like is usually programmed and controlled by means of a keypad and panel which permits an installer to program various zones and account for specific variables of particular environments by adjusting and selecting from an array of features. The face of a control panel's keypad typically has a plurality of alpha-numeric characters, light emitting diodes (LEDs), seven segment displays or the like. Conventional keypads also typically include a liquid crystal display (LCD) to provide messages to the installer or ultimate user and one or more light emitting diodes (LEDs) which provide visual indications of fault conditions, programming modes, alarm modes, etc. While numeric push-button keys on the keyboard typically will incorporate the actual numeral they represent (e.g., 0–9), certain keys are utilized for various functions and the numeric keys can be utilized in alternative modes similar to a shift key on a computer keyboard.

Thus, in the prior art, the keypad face is typically covered with writings which have been silk screened or printed on a label with written indicia. It is also typical for the label or direct printing on the keypad (or other transparent) template to include the name or logo of the monitoring company and/or an emergency telephone.

The pre-fabricated label has proven to be inconvenient since, once created, it cannot be modified. Thus, if an installation company wants to customize the keypad, customize the language, customize the functional words, or changes its name, corporate logo, or any other information provided on the pre-fabricated label, the panels cannot be sold. Furthermore, based on much consolidation in the alarm industry, many installation companies provide services internationally. Thus, it is often necessary to provide alpha-numeric information on the panel in various languages. The end result is that, at times, an installation company may have actual product inventory on hand but with a label in the wrong language. Additionally, some installation companies utilize different central stations depending on location, services required, etc. Thus, keypads indicating different monitoring companies are sometimes required.

It is, therefore, a primary object of the present invention to provide a new and improved customized overlay template for an alarm control panel keypad.

It is another object of the present invention to provide a new and improved customized overlay template for an alarm control panel keypad which is inexpensive and convenient to produce.

It is yet a further object of the present invention to provide a new and improved customized overlay template for an alarm control panel keypad which can be easily modified.

Further objects and advantages of the present invention will become apparent as the following description proceeds.

SUMMARY OF THE INVENTION

Briefly stated and in accordance with the preferred embodiment of the present invention, an alarm control panel and keypad for programming a security system is described having a panel face which includes a plurality of push-button activation keys comprising a customized overlay template which is sized to overlay the keypad face in a manner which maintains exposure to the push-button activation keys and displays, wherein the customized overlay template is formed by feeding a standard-sized, rectangular paper through a printer which provides desired written indicia whereby the customized template is separated from the paper or plastic sheet by means of pre-fabricated perforations. The customized overlay template typically could be applied to the keypad face by means of an overlaying protective acrylic cover, but also may be glued directly to the face of the keypad.

BRIEF DESCRIPTION OF THE DRAWINGS

While the specification concludes with claims particularly pointing out and distinctly claiming the subject matter regarded as the invention herein, it is believed that the present invention will be more readily understood upon consideration of the following description, taken in conjunction with the accompanying drawings, wherein:

DESCRIPTION OF THE PREFERRED EMBODIMENT

Figure 1:
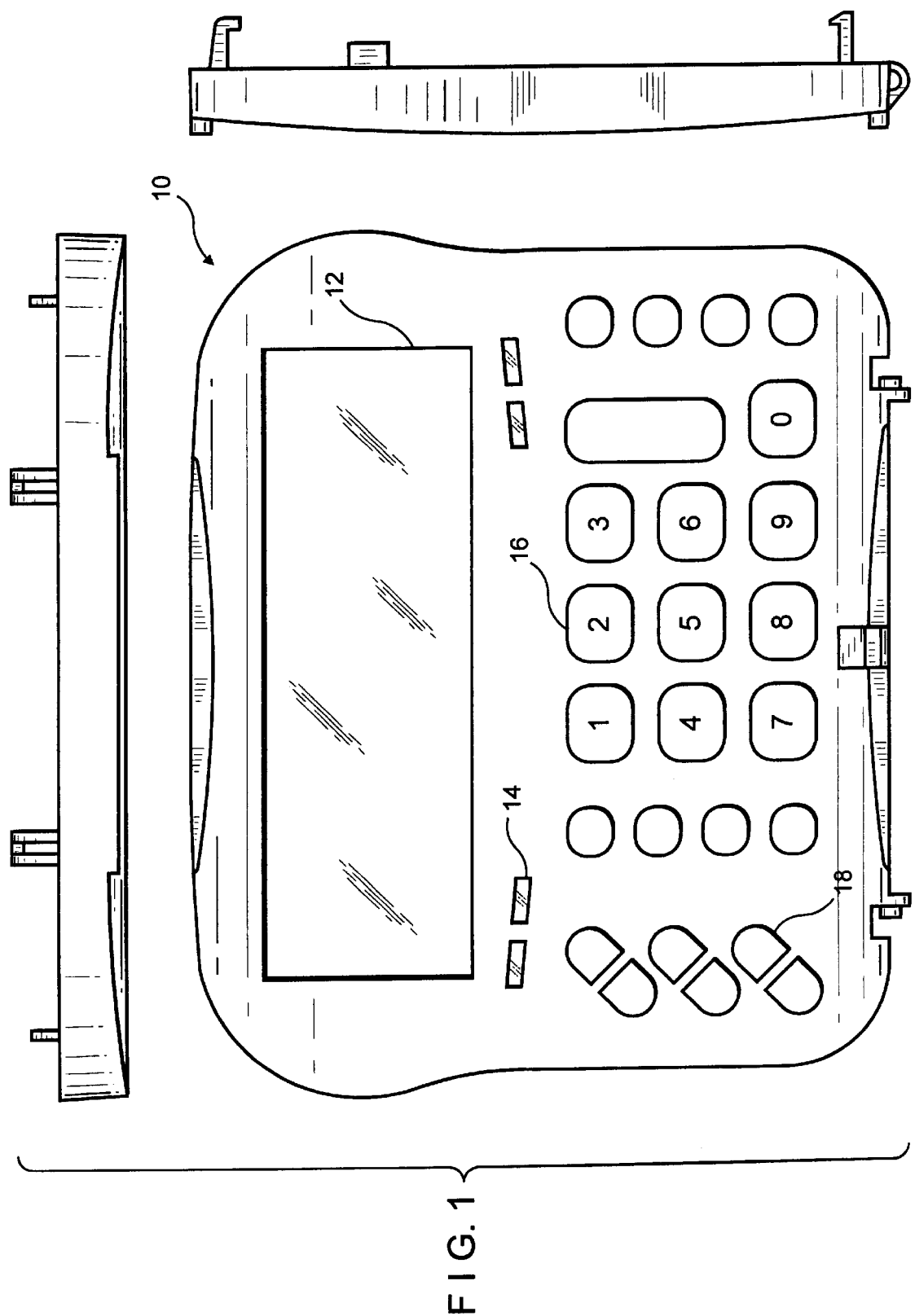
FIG. 1 is a front, top, and side view of an alarm panel keypad used in accordance with the present invention.

Referring to FIG. 1, a conventional alarm control panel and keypad, generally designated 10, is shown. Control panel and keypad 10, as shown in FIG. 1, is missing its protective and transparent cover which overlays the face of the device. Control panel and keypad 10 includes an LCD 12, a plurality of LEDs 14, and a plurality of keys including numeric keys 16 and nonnumeric keys 18. It will be noted that alarm control panel and keypad 10 has been shown in a generally rectangular shape for illustrative purposes. However, control panels can be of any shape or size.

Figure 2:
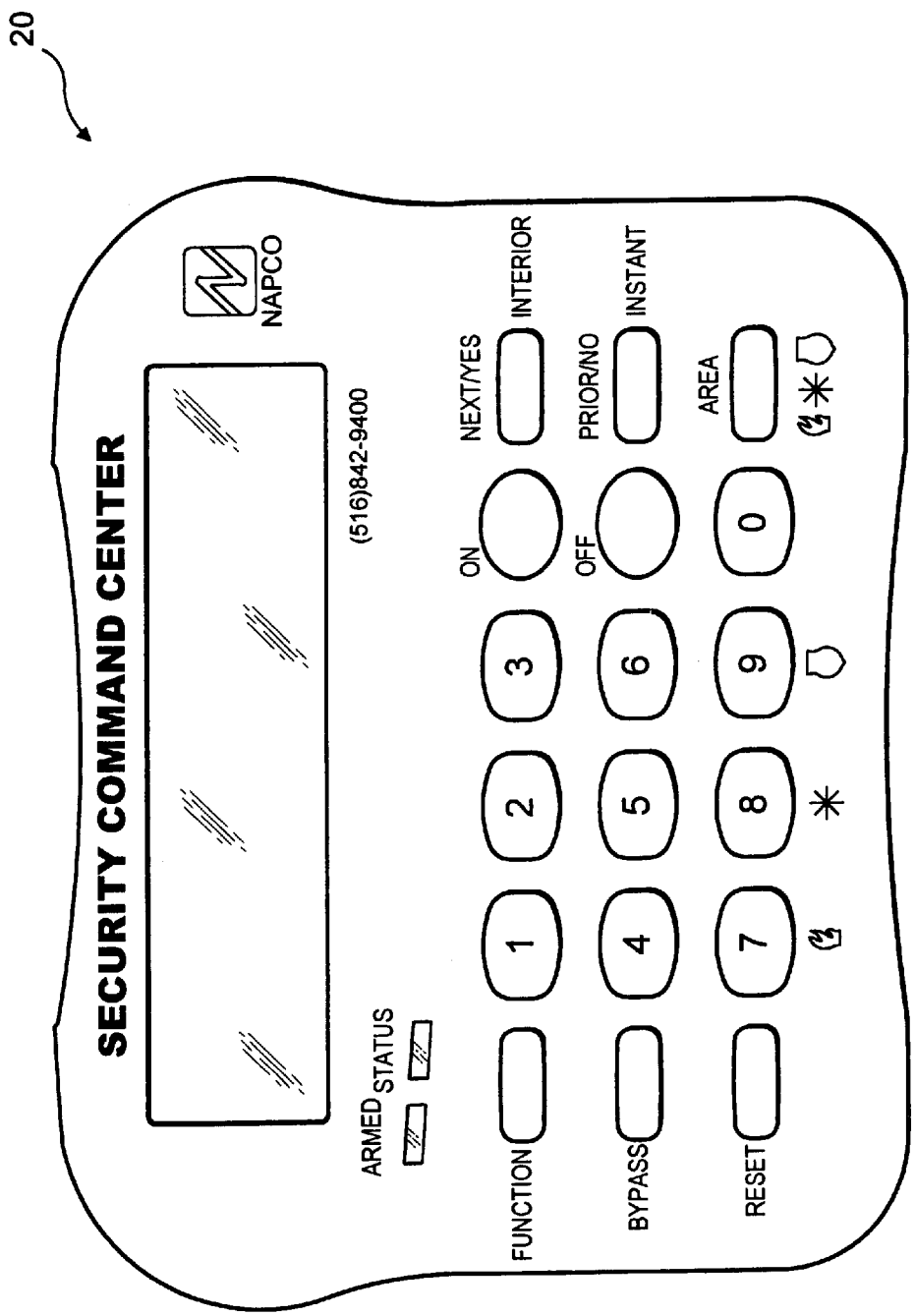
FIG. 2 is a schematic illustration of a prior art prefabricated acrylic overlay template.

Referring to FIG. 2, a prior art template is shown. Template 20 is typically made of plastic or metal material and includes written indicia generated in the prior art by a silk screening process or a photo printed process. The silk screening process or the like provides information such as a corporate logo, a telephone number, and the identification of non-numeric keys such as "FUNCTION", "BYPASS", and the like. Without this written information, it would be impossible for the user or installer to understand what these non-numeric keys represented. Furthermore, under the numeric keys represented in FIG. 1 as numerals "7", "8", and "9", it is apparent that these keys can also be used as panic buttons for the police department and the like. If, in certain jurisdictions, these symbols must be changed, the devices are rendered unusable since silk-screening produced products or the like can not be modified.

It should be noted that prior art template 20 varies slightly in shape compared to alarm control panel and keypad 10 in FIG. 1. Thus, template 20 would not be used in conjunction with the panel keypad shape of FIG. 1. However, in actual use, template 20 would be placed over a corresponding type of keypad typically by means of a plastic snap. Furthermore, it is obvious that template 20 has been created for use by English speaking users. While separate silk screens or the like might be created in other languages, inventories must be properly maintained. While it is possible to maintain an inventory of keypads with various languages and custom descriptions or a supply of custom labels which have to be properly inventoried, this results in unnecessary expense and a significant likelihood of error.

Figure 3:
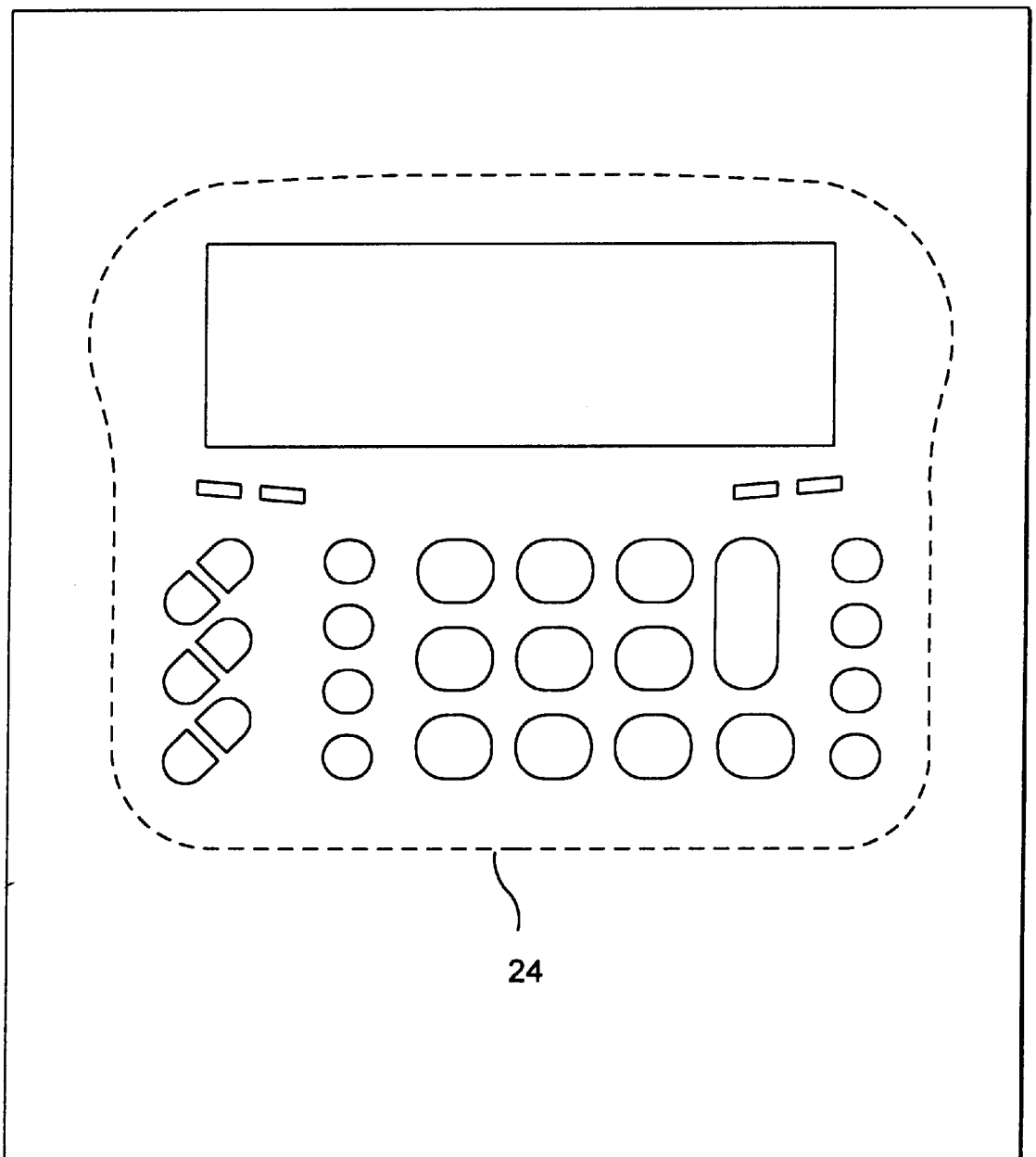
FIG. 3 is a schematic representation of a perforated bond paper capable of being fed through a laser printer in accordance with the present invention.

Turning now to FIG. 3, a high quality, standard-size bond paper or plastic sheet 22 is represented with a perforated or die cut paper template 24. Although only one paper template 24 is illustrated for purposes of simplicity, more than one overlay template could be perforated on paper or plastic sheet 22. Through extensive investigation, it has been shown that 7 mil paper is preferred in the present invention. Sheet 22 is preferably of a size that it easily fed through standard printers such as 8½ inch by 11 inch paper, 8½ inch by 14 inch paper, or the like and A4 (European standard-size) paper. Bond paper 22 can be replaced with plastic sheets as long as the sheets utilized can be fed through a printer.

Figure 4:
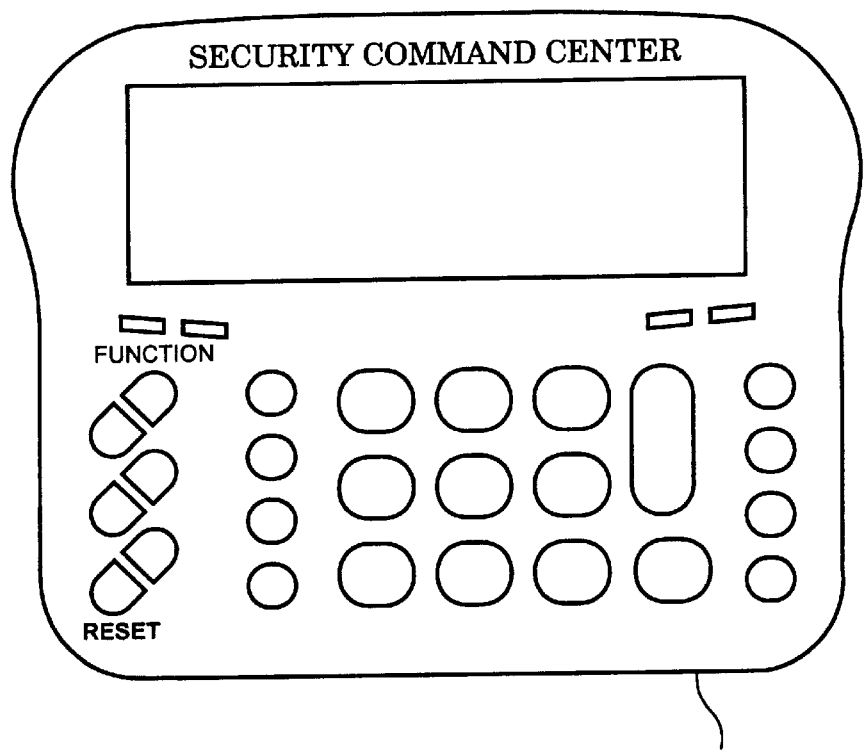
FIG. 4 is a schematic illustration of a customized overlay template formed in accordance with the present invention.

Using one of numerous programs available such as MICROSOFT PUBLISHER®, bit maps can be customized to provide specific alpha-numeric or graphical information on paper template 24. Sheet 22 is then fed through a standard laser printer (usually capable of providing color) and separated along its perforations to create customized overlay template 26 as represented in FIG. 4. In this specific instance, the printing program was utilized only to incorporate the language "FUNCTION", "RESET", and "SECURITY COMMAND CENTER." However, any number of defined bit maps could have been completed. Customized template overlay 26 could be created utilizing any language, text color, graphics and the like. However, since it is critical that certain keys are defined, the program provided to create customized template overlay 26 could require that certain written indicia would not be changeable, but all this is the choice of the user who can create the template overlay nomenclature.

Figure 5:
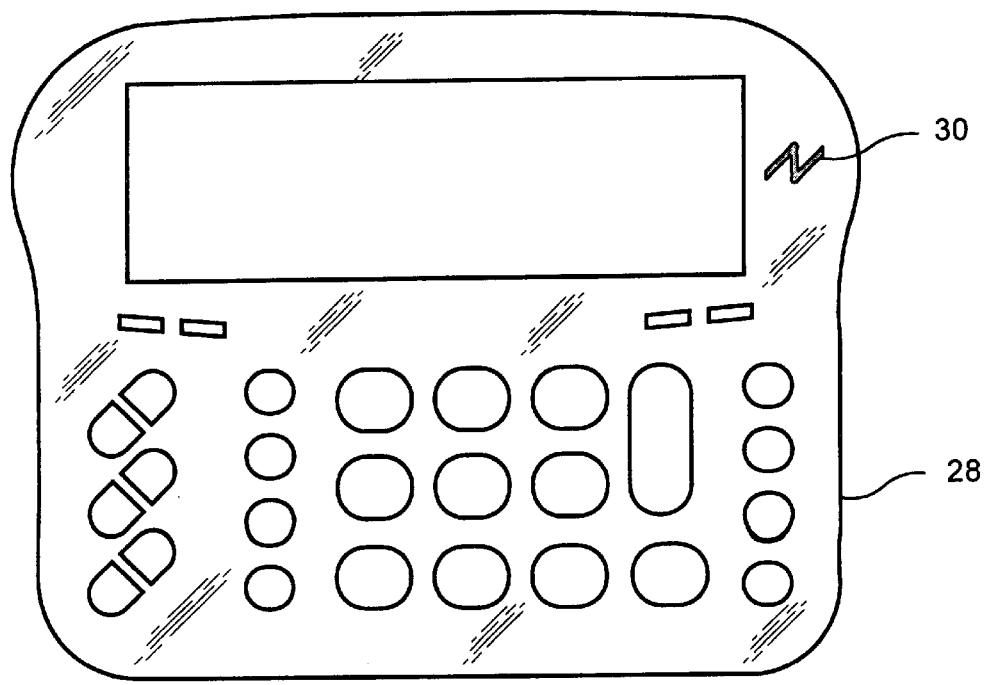
FIG. 5 is a clear acrylic cover to protect the overlay template of FIG. 4 in accordance with the present invention.

FIG. 5 represents a transparent cover 28 which overlays customized template overlay 26 and can be snapped into place on alarm control panel 10. Transparent cover 28 may be provided in a completely transparent format or with the manufacturer's logo 30 so that such information must always be provided. Manufacturer information could also be provided by providing it in a non-modifiable bit map. While cover 28 must be transparent in order to permit a person to read the written indicia on overlay template 26, it may be tinted to eliminate glare. Furthermore, although transparent cover 28 has been shown with cut-outs corresponding to the raised alpha-numeric keys such that it completely overlays template 26, if cover 28 is fabricated of sufficiently flexible material, it can be formed to overlay the alpha-numeric keys as long as such push-button keys could still be depressed. In this instance, a cover 28 would not only protect overlay template 26 but would also prevent smudges and the like on the alpha-numeric keys.

The advantages provided by the present invention can be achieved in numerous ways. For instance, the alarm control panel manufacturer can sell a device with a particular overlay template already prepared based on ordering instructions from the installer or perforated sheets, such as shown in FIG. 3, can be provided along with the required software to permit an installer to create its own overlay template. In either case, inventory levels are more easily maintained and costs are reduced. Furthermore, while overlay template 26 has been defined as being created by means of perforations this is not intended to limit the means from which template 24 can be separated from paper 22 only to a series of bores; other well-known means for separating a portion of a page can be implemented. For instance, template 26 could be formulated by a peel-back glue tab. In such instances, transparent cover 28 might not be required; instead overlay template 26 can be glued directly on the face of control panel keypad 10.

It will be apparent from the foregoing description that the present invention provides a customized overlay template for an alarm control panel keypad which is easily modified and inexpensive to produce. The present invention also helps alarm companies control inventory as well as allow the manufacturer to be able to supply the alarm company a product that has no lead time and total customization.

While it has been shown and described what is presently considered to be the preferred embodiment of this invention, it will be obvious to those skilled in the art that various changes and modifications may be made without departing from the broader aspects of this invention. For instance, while the advantages of a modifiable overlay template for an alarm control panel keypad has been described in conjunction with the sale of such devices from a manufacturer to an installer, such customization can also be used as a marketing tool from the installation company to its customer. For instance, overlay templates could be created which incorporate any digital picture of a homeowner's choice.

It is, therefore, aimed in the appended claims to cover all such changes and modifications as fall within the true scope and spirit of the invention.

I claim:

1. An alarm control panel keypad for programming a security system having a keypad panel face including a plurality of push-button activation keys comprising:

a customized overlay template sized to overlay said keypad panel face in a manner which maintains exposure to said push-button activation keys wherein said customized overlay template is formed by feeding a standard-sized, generally rectangular sheet through a printer which provides desired written indicia on said overlay template, and said customized overlay template is separated from said sheet by a pre-fabricated technique.

2. The alarm control panel keypad of claim 1 further comprising:

an acrylic cover overlaying said customized overlay template.

3. The alarm control panel keypad of claim 1 wherein said written indicia is defined by pre-determined bit maps.

4. The alarm control panel keypad of claim 1 wherein said sheet is comprised of plastic.

5. The alarm control panel keypad of claim 1 wherein said sheet is comprised of bond paper.

* * * * *